(12) United States Patent
Trio

(10) Patent No.: US 9,408,489 B2
(45) Date of Patent: Aug. 9, 2016

(54) INFUSION UNIT FOR PRODUCING COFFEE SUITABLE FOR WASHING IN THE DISHWASHER

(75) Inventor: Fabio Trio, Turbenthal (CH)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1514 days.

(21) Appl. No.: 12/519,627

(22) PCT Filed: Dec. 11, 2007

(86) PCT No.: PCT/EP2007/010816
§ 371 (c)(1),
(2), (4) Date: Jun. 17, 2009

(87) PCT Pub. No.: WO2008/074421
PCT Pub. Date: Jun. 26, 2008

(65) Prior Publication Data
US 2010/0064897 A1 Mar. 18, 2010

(30) Foreign Application Priority Data
Dec. 19, 2006 (IT) ................. FI2006A0331

(51) Int. Cl.
A47J 31/06 (2006.01)
A47J 31/36 (2006.01)
B65D 85/804 (2006.01)

(52) U.S. Cl.
CPC .......... *A47J 31/3614* (2013.01); *A47J 31/0663* (2013.01); *B65D 85/8043* (2013.01)

(58) Field of Classification Search
CPC ....... A47J 31/56; A47J 31/42; A47J 31/3614; A47J 31/408; A47J 31/3633; A47J 31/46; A47J 31/20; A47J 31/057; A47J 31/0663; A47J 31/0573; A47J 37/0704; A47J 37/1295; B65D 85/8043; A23C 3/037
USPC ...... 99/283, 286, 289 R, 289 T, 289 D, 289 P, 99/290, 295, 297, 300, 302 R, 302 P, 304, 99/307, 399, 410; 426/474
See application file for complete search history.

(56) References Cited

U.S. PATENT DOCUMENTS

| | | | | |
|---|---|---|---|---|
| 3,369,478 A | * | 2/1968 | Black | 99/289 R |
| 3,552,976 A | * | 1/1971 | King | 426/433 |
| 4,681,028 A | * | 7/1987 | Schmed et al. | 99/289 R |
| 5,259,296 A | * | 11/1993 | Mikael et al. | 99/280 |
| 6,116,147 A | * | 9/2000 | Schmed | 99/302 P |
| 6,240,832 B1 | * | 6/2001 | Schmed et al. | 99/289 R |
| 6,536,332 B2 | * | 3/2003 | Schmed | 99/295 |

FOREIGN PATENT DOCUMENTS

| | | |
|---|---|---|
| EP | 0 559 620 | 9/1993 |
| EP | 1306041 A1 | 5/2003 |
| GB | 1 164 760 | 9/1969 |
| JP | 7008396 A | 1/1995 |
| JP | 7289436 A | 11/1995 |
| WO | WO 2009069167 A1 * 6/2009 | A47J 31/36 |

* cited by examiner

*Primary Examiner* — Dana Ross
*Assistant Examiner* — Hemant Mathew

(57) ABSTRACT

The removable infusion unit to produce hot beverages, in particular coffee, comprises a supporting structure (3, 5) mechanically connected to an infusion chamber comprising a first portion and a second portion, moving with respect to each other, and a mechanism for opening and closing said infusion chamber. The supporting structure and the opening and closing mechanism of the infusion chamber are made of materials that do not require external lubrication.

47 Claims, 5 Drawing Sheets

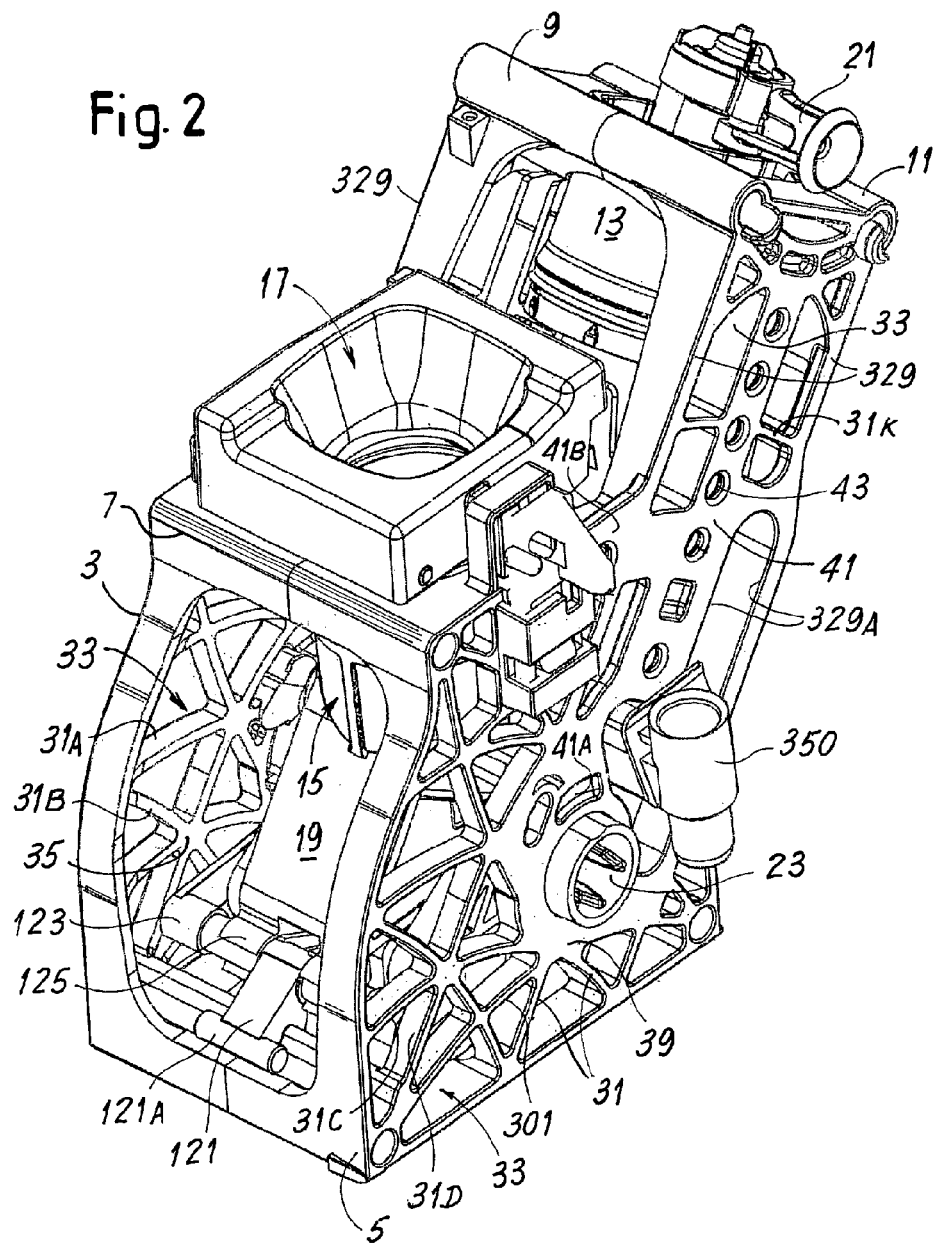

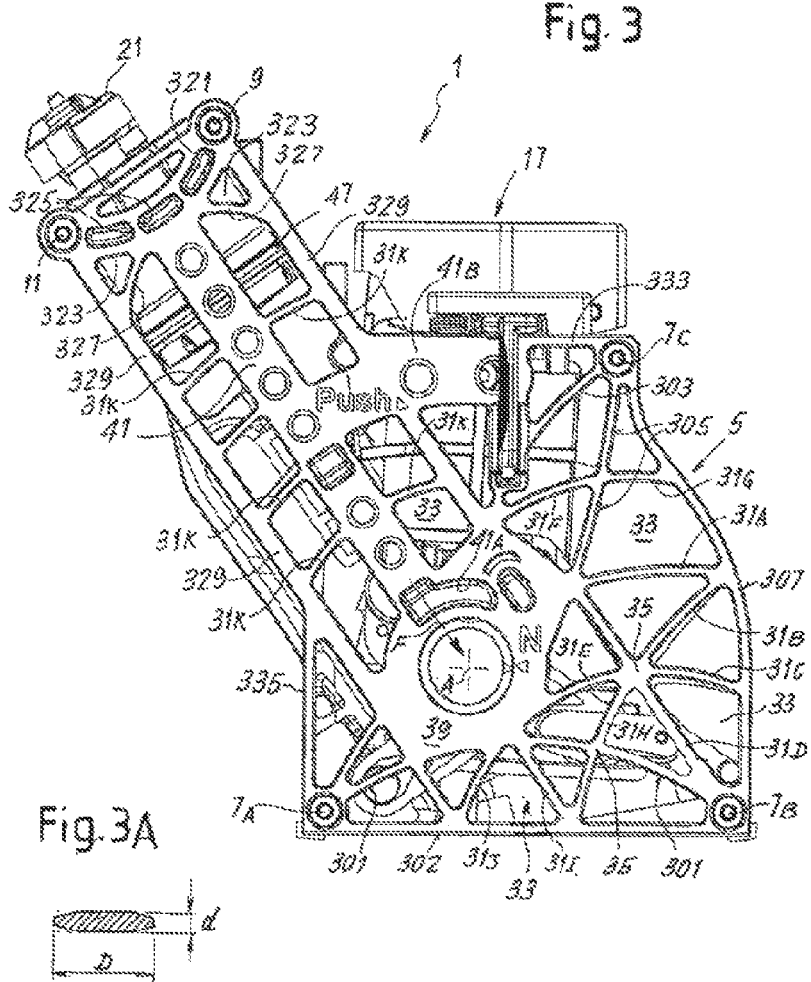

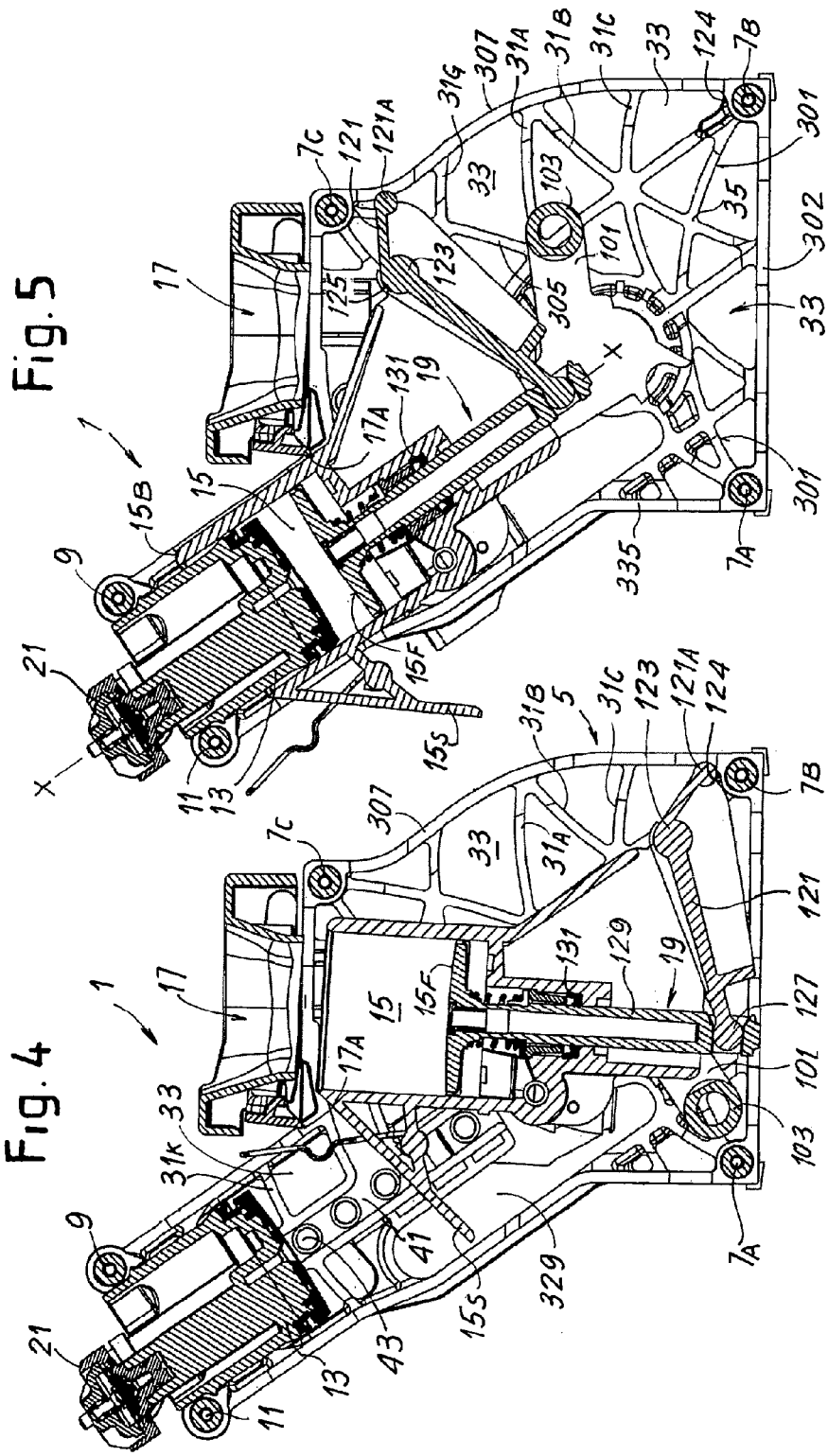

INFUSION UNIT FOR PRODUCING COFFEE SUITABLE FOR WASHING IN THE DISHWASHER

TECHNICAL FIELD

The present invention relates to an infusion unit for producing coffee. More specifically, the present invention relates to an infusion unit for coffee machines for domestic or professional use, or for vending machines, of the type comprising a structure, positioned inside which is an infusion chamber comprising two portions, moving with respect to each other to open and close the infusion chamber.

PRIOR ART

Infusion units of the type mentioned above are widely used in the coffee machine field, both for domestic and commercial use, for example in automatic vending machines. An infusion unit of this type is described in U.S. Pat. No. 4,681,028 and is produced and used in the coffee machines of models marked with the trade names Idea, SG500, FS400, Royal, SG200, Magic, Incanto, Vienna and others by Saeco International Group S.p.A., Gaggio Montano (BO), Italy.

The removable nature of the infusion unit facilitates washing under running water. After a certain number of hand rinses and/or after a specific number of dispensing cycles, it may be necessary to lubricate the moving parts of the unit. For this purpose, lubrication kits with single doses of lubricating grease have been provided, for the user to easily apply to points in which mechanical parts (usually made of plastic) are in reciprocal contact and moving with respect to each other. Nonetheless, these operations are tiresome and require the purchase of expendable materials.

Infusion units that cannot be removed require special wash cycles with the use of additives that are introduced into the circuit of the coffee machine, with consequent negative effects in terms of cost and also possible changes, albeit temporary, of the organoleptic properties of the beverage produced in the cycles subsequent to washing.

OBJECT AND SUMMARY OF THE INVENTION

The object of the present invention is the improvement of an infusion unit of the aforesaid type to allow easier and more efficient washing.

In one embodiment, the invention provides for an infusion unit of the aforesaid type that can be easily washed in the dishwasher. Inside these household appliances, washing takes place with water at temperatures, even relatively high (50-70° C.), and with the addition of aggressive detergents. These would remove the lubricating grease applied to moving parts in reciprocal contact and therefore lubrication would have to be repeated after each wash. The lubricants removed from the dispensing unit would be pollutants, harmful for the environment.

Therefore, the object of an advantageous embodiment of the invention is to make the infusion unit washable, even in the dishwasher. For this purpose, advantageously at least some of the parts of the infusion unit in reciprocal contact and moving with respect to one another have, at least in areas of reciprocal contact and friction, different self-lubrication properties to one another. For example, at a turning pair, such as a friction support of the motor shaft for operating opening and closing of the infusion chamber, the shaft can be made of a material with a higher self-lubricating capacity with respect to the support or vice versa. The sliding pair can be produced in the same way.

Following a consolidated nomenclature in the sphere of mechanics applied to machines, in the present description and in the appended claims, kinematic pair is intended as a pair of mechanical components or elements in contact on respective portions of the surface thereof, and provided with a reciprocal movement with respect to each other, which reciprocally constrain two mechanical components to which they belong. The mechanical components or elements forming a kinematic pair are also defined kinematic elements.

In a possible embodiment, the different self-lubricating properties between the two portions in reciprocal movement and contact can be obtained using plastic resins with different self-lubricating properties for the two portions. In a different, currently preferred embodiment the synthetic resin forming one of the two portions, i.e. one of the two kinematic elements, can be filled with a self-lubricating material and the synthetic resin of the other portion, i.e. of the other kinematic element of the pair, can be left without this self-lubricating filler.

In a different embodiment, the two portions in reciprocal contact and movement can be filled with different quantities or different types of self-lubricating substances.

The material with which the synthetic resin is filled to make it self-lubricating can, for example, be graphite, molybdenum, polytetrafluoroethylene (known commercially as Teflon®) or another suitable material.

According to another possible embodiment of the invention, the self-lubricating properties can be obtained with a surface treatment of the portions in reciprocal contact. In a possible implementation, nanotechnology treatments can be used.

In a particularly simple embodiment, the entire mechanical part or component forming with a portion thereof a kinematic element of a pair, can be produced with the same self-lubricating properties (or lack of self-lubrication). For example, the entire part can be made of synthetic resin without self-lubricating filler, while the mechanical component defining the other kinematic element of the kinematic pair will be made of plastic material filled substantially uniformly with self-lubricating material. Alternatively, the entire surface of the part defining the first kinematic element of the pair can be processed to obtain self-lubricating properties substantially uniform and different to those of the entire surface of the mechanical component forming the other kinematic element of the pair.

Nonetheless, as only a part and not the whole of the surface will be in friction contact with an analogous portion of an adjacent part, in an advantageous embodiment of the invention only a portion of the part is provided with the required self-lubricating properties. In this way, various advantages are obtained, such as a decrease of the material forming the self-lubricating filler, with consequent reduction in costs. Moreover, in this way lubricating treatments or fillers that are not suitable for contact with food products can be used, as the kinematic elements, intended as those portions of the mechanical components that are in reciprocal contact and movement, do not require to come into contact with the coffee powder or with the beverage extracted therefrom.

By treating or charging the synthetic resin forming different parts of the same part in different ways, it is also easier to produce all the kinematic pairs with kinematic elements having different self-lubricating capacities.

According to a different aspect, to make the infusion unit easier to wash in the dishwasher, in a possible embodiment of the invention the surfaces to be washed can be easily reached by the jets of water produced in the dishwasher by producing the removable infusion unit with a supporting structure, e.g. comprising a pair of sides, designed with a plurality of openings to allow washing of the infusion chamber and of the opening and closing mechanism of the chamber, which are located, for example, between the sides belonging to the supporting structure, by means of jets of water of the dishwasher which can pass through the sides due to the presence of said openings. Preferably, when the supporting structure has two parallel sides between which the infusion chamber is positioned, both sides are provided with openings, although part of the advantages of the present invention can be attained with a single side provided with openings.

According to a preferred embodiment of the invention, the infusion unit has both a supporting structure provided with openings to facilitate washing, and reciprocally moving parts characterized by different self-lubricating capacities from one another. The first characteristic allows improved penetration of water and detergents, while the second excludes the need for any type of external lubricant applied to the moving parts. However, it must be understood that part of the advantages described above can also be obtained only by exploiting the embodiment of alternate self-lubricating and non-lubricating moving parts (or in any case with different self-lubricating properties), to form one or more of the kinematic pairs of the infusion unit.

The supporting structure could also be used without the self-lubricating properties described, although with fewer advantages, as this would require repeated application of external lubricants for lubrication.

According to an advantageous embodiment of an infusion unit with an open structure, the pair of sides or other supporting structure comprises, and is at least partly defined by, linear elements surrounding the openings, i.e. defining said openings and forming a mechanical supporting structure of the infusion chamber and of the opening and closing mechanism of said chamber. In a possible embodiment, the sides of the infusion unit comprise a framework structure defining the openings for the jets of washing water to pass through. The framework structure is advantageously formed by the aforesaid linear elements.

According to an advantageous embodiment of the invention, the linear elements extend according to a trend similar to the trend of the lines of force in the supporting structure, for example the sides, i.e. those lines along which the strains that the structure must withstand during operation thereof are concentrated, in particular stresses deriving from compression of the coffee inside the infusion chamber when this is closed and the reactions caused by the pressure inside the infusion chamber during dispensing of the coffee.

Further advantageous embodiments and preferred features of an infusion unit according to the invention are set forth in the appended dependent claims and will be described in greater detail hereunder with reference to an example of implementation.

In particular, to facilitate the use of the infusion unit, the supporting structure thereof can advantageously be made of a self-lubricating material and preferably of a plastic material containing self-lubricating substances therewithin. These self-lubricating substances can, for example, be formed of molybdenum, graphite or the like.

BRIEF DESCRIPTION OF THE DRAWINGS

The invention will be better understood by following the description and the accompanying drawing, which shows a practical non-limiting embodiment of the invention. More specifically, in the drawing:

FIGS. 1 and 2 show two axonometric views of an infusion unit according to the invention according to different angles;

FIG. 3 shows a side view of the infusion unit in FIGS. 1 and 2;

FIG. 3A shows a schematic local section of one of the elements forming the framework or lattice of one of the sides;

FIGS. 4 and 5 show a section according to a median plane of the infusion unit in two positions (respectively open and closed) of the infusion chamber.

DETAILED DESCRIPTION OF AN EMBODIMENT OF THE INVENTION

Figure 1:
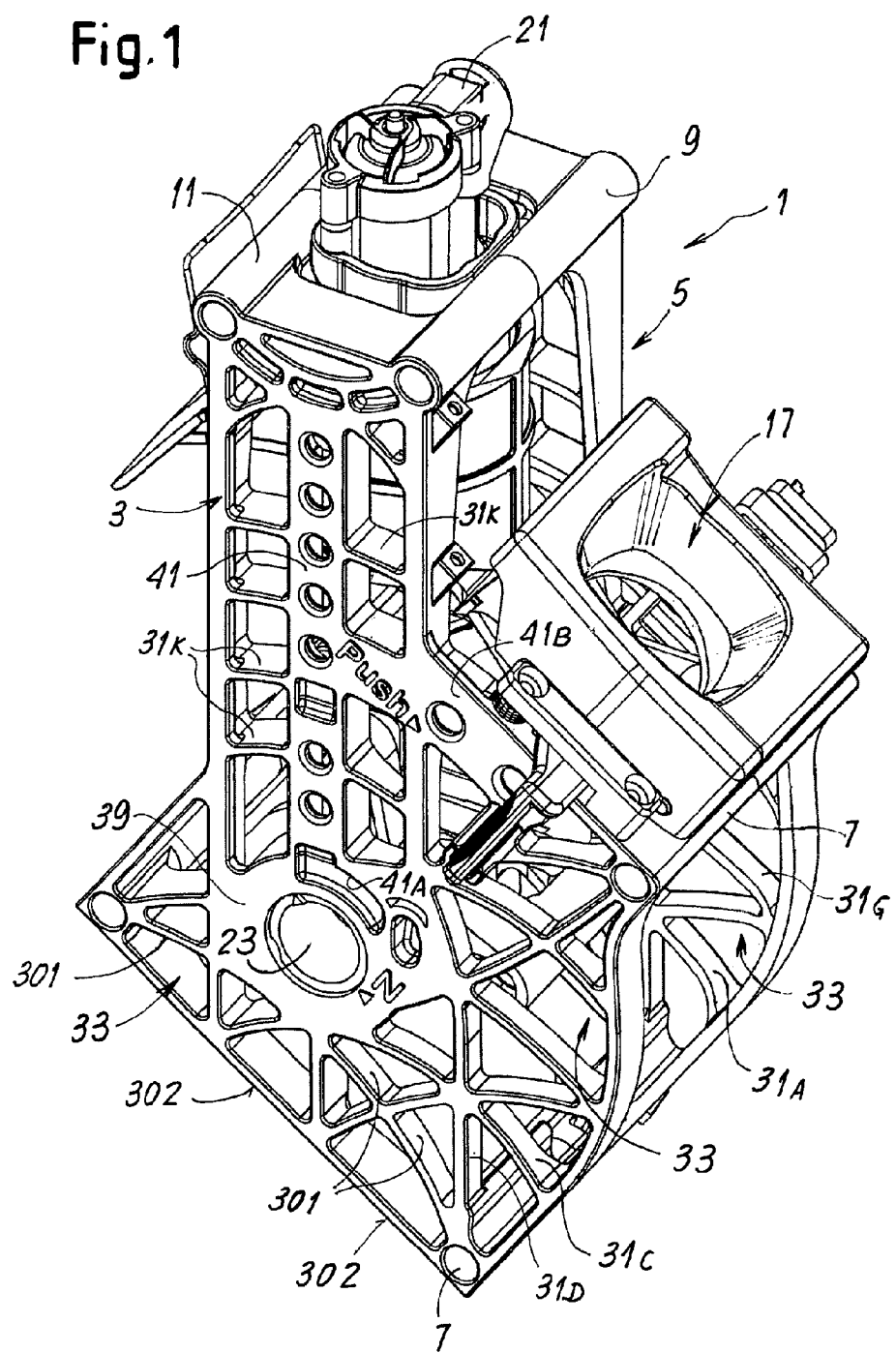

Described hereunder is an application to an infusion unit for producing coffee, of the type comprising a pair of sides forming the supporting structure. It must however be understood that similar advantages can be obtained in infusion units for producing other types of beverage, and also with other configurations of the supporting structure, and of the parts, each time it is useful to configure said structure in such a way as to facilitate or simplify washing thereof.

In a possible embodiment, the infusion unit, generically indicated with 1, comprises a supporting and containing structure of the infusion chamber and of the opening and closing mechanism of said chamber. In a preferred embodiment of the invention, the supporting structure substantially comprises a first side 3 and a second side 5 joined to each other at crossbars 7A, 7B, 7C, 9, 11.

Positioned between the sides 3 and 5 (FIGS. 4 and 5) is an infusion chamber comprising a first fixed portion 13 and a second portion 15 moving between an open position shown in FIG. 4 and an operating position, i.e. in which the infusion chamber is closed, shown in FIG. 5. In FIG. 4 the moving portion 15 of the infusion chamber is located under the hopper 17 through which the coffee powder, coming from a powder reservoir, from a grinding device, from a manual loading inlet or the like, is loaded into the inside of the compartment defined in the moving portion 15 of the infusion chamber. The opening and closing mechanism, indicated as a whole with 19 and housed between the two sides 3 and 5, causes the movement to close the infusion chamber and compress the coffee powder contained inside the moving portion 15. The opening and closing mechanism 19 of the infusion chamber has a motor shaft 23 supported in respective seats of the sides 3 and 5 of the supporting structure of the infusion unit and pivoting or rotating about an axis A-A.

Associated with the infusion chamber, and more specifically with the fixed portion 13 of said chamber, is a valve 21, through which the beverage produced by pressurized and high temperature water passing through the compressed coffee powder contained in the infusion chamber is dispensed.

The opening and closing mechanism of the infusion chamber, the structure of the two portions 13, 15 forming said chamber and the method according to which the cycle to load the coffee, perform infusion and unload the spent coffee grounds, are known per se.

Here it is sufficient to observe (see in particular FIGS. 4, 5, 6) that the mechanism 19 comprises a pair of L-shaped arms 101 integral with the motor shaft 23, and joined by a crossbar 103 integral with a first of the two ends of each L-shaped arm 101. Hinged by means of a pin 105 at the opposite ends of each arm 101 is a slider 107 sliding in a guide 109 produced in one piece with the moving portion 15 of the infusion chamber.

By comparing FIGS. 4 and 5 it can be seen that pivoting of the pair of arms 101 about the axis of the shaft 23 causes pivoting and translation of the portion 15 of the infusion chamber from one to the other of the two loading (FIG. 4) and infusion (FIG. 5) positions. In the position in FIGS. 5 and 6, the infusion chamber 13, 15 is in the closed position with the coffee powder (not shown) compressed and ready for feed of pressurized hot water to extract the flavors from the coffee powder. In this position the portion of the L-shaped arms 101 to which the sliders 105 are constrained are aligned, i.e. substantially parallel to the axis X-X of the closed infusion chamber, so that stress deriving from the compression force exerted on the coffee powder and by the pressure of the water fed into the infusion chamber is transferred to the support of the shaft 23 without generating torque on the motor shaft 23.

The mechanism 19 also comprises a device to control sliding of the base 15F of the moving portion 15 of the infusion chamber. In a way known per se, this movement must be synchronized with the translational and pivoting movement of the moving portion 15 of the infusion chamber, so that during opening of the chamber (from the position in FIG. 5 to the position in FIG. 4 at the end of the infusion cycle) the base 15F is aligned with the upper edge 15B which during the pivoting movement grazes a blade edge 17A integral with the hopper 17. This guarantees detaching of the spent coffee tablet and unloading thereof along a surface 15S of the moving portion 15 of the infusion chamber.

The movement of the base 15F with respect to the remaining portion 15 of the infusion chamber is controlled by a lever 121 integral with a pin 123 pivoting in a supporting seat 125 made in one piece by the material forming the moving portion 15 of the infusion chamber. The lever 121 has an end 121A cooperating with a fixed stop 124 formed on the crossbar 7B that joins the sides 3, 5, when the infusion chamber is in the position in FIG. 4. At the opposite end the lever 121 has an end forming a hinged joint with a rod 129 integral with the base 15F, sliding in a through hole in the body of the portion 15 and which is sealed by a lip seal ring 131. The lever 121, cooperating with the stop 124 and with lateral projections, not shown and acting on cam profiles provided on the sides 3, 5 (not shown and known per se), pivots synchronously with the pivoting and translational movement of the portion 15 of the infusion chamber on which it is supported. The pivoting movement of the lever 121 in the seat 125 controls sliding of the base 15F inside the compartment containing the coffee powder formed in the moving portion 15 of the infusion chamber.

From the brief explanation above concerning the structure of the operating mechanism 19, it is apparent that this mechanism has a plurality of kinematic pairs, i.e. reciprocally connected kinematic elements, moving and sliding on each other. For example, a first turning pair is formed of the motor shaft 23 and of the respective seat in the sides 3, 5; a further turning pair is defined between the seat 125 and the pin 123 of the lever 121; a sliding pair is defined between each slider 107 and the respective guide 109; a turning pair is formed at the articulated joint 127.

It must be understood that the mechanism illustrated in the accompanying drawings and described briefly above, used, for example, in infusion units contained in many machines produced by Saeco International Group S.p.A. (Italy), is one of the possible mechanisms for opening and closing the infusion chamber and that other different mechanisms are conceivable. Nonetheless, in all cases there will be parts that move reciprocally and are in contact, typically made of plastic material, i.e. of synthetic resin, forming the same number of kinematic pairs.

To prevent the kinematic pairs from requiring external lubrication in order to operate correctly and silently, or in any case with a noise level that is acceptable for the type of machine in which the infusion units are used, advantageously at least some of the kinematic pairs have surfaces in reciprocal contact produced with different self-lubricating properties. This applies above all to those kinematic pairs that are subject to high loads.

In particular, in the mechanism illustrated in the drawing, the coupling between the motor shaft 23 and respective seats in the sides 3, 5 and the coupling between the guides 109 and the sliders 107 are particularly stressed. The mechanical components of the infusion unit forming these couplings or kinematic pairs can be produced so that the sliding surfaces that are in reciprocal contact have different properties with regard to lubrication. For example, the sides 3, 5, or at least the seats formed therefrom for supporting the motor shaft 23, can have no self-lubricating filler, while the shaft 23 can be produced, at least in the area in contact with the supports, with a plastic material to which a filler of self-lubricating material is added. In this way the shaft-support turning pair will be formed by plastic materials in direct contact and provided with a frictional movement, but with properties that obtain efficient self-lubrication, also sufficient for the high loads to which this pair is subjected, which does not require external lubrication. The basic plastic material can, for example, be polyoxymethylene, or another material already having per se some degree of self-lubricating properties. According to an advantageous embodiment of the invention, each of the sides 3 and 5 has a framework structure, i.e. a structure that, instead of being formed of a solid plate, is composed of a plurality of linear elements of various shape, some of which are indicated with 31, delimiting openings 33 in the respective sides 3, 5.

According to an advantageous embodiment, the elements 31 have a substantially rectangular elongated cross section, which may be tapered, as shown schematically in the section in FIG. 3A. The dimension D of the cross section of the elements 31, orthogonal to the plane of the respective side is substantially greater, e.g. 2-5 times greater with respect to the minor dimension d, parallel to said side. The position and dimension of the individual elements forming the framework can be defined by a structural calculation in order to obtain a structure suitable to support the stresses exerted thereon during the various stages of the operating cycle of the infusion unit.

In this way two sides 3, 5 with wide openings 33 are obtained, through which the jet of water produced inside the dishwasher, in which the unit can be placed to be washed, can flow. These jets of water easily reach the opening and closing mechanism 19 of the infusion chamber, and the fixed portion 13 and moving portion 15 thereof. The infusion unit can thus be washed efficiently in the dishwasher. On the other hand, the openings 33 also facilitate hand washing of the infusion unit, compared with what can be obtained with conventional units in which the sides 3, 5 are solid.

As can be observed in the figure, the linear elements 31 defining the openings 33 have crossing or intersecting areas, in which nodes are formed, some of which are indicated with 35 in the figures. The shape and arrangement of the linear elements 31, their length, their intersecting points or nodes and the areas in which they interlock with the edges of the sides are determined as a function of structural analysis of stresses to which the sides 3, 5 are subjected during use of the unit, so that the material forming the framework structure is concentrated along the force lines inside said sides 3, 5. In particular, a large quantity of material is concentrated around the axle or shaft 23 of the opening and closing mechanism 19 of the infusion chamber, to form a solid area 39, to which the curved linear elements 31 connect.

Figure 6:
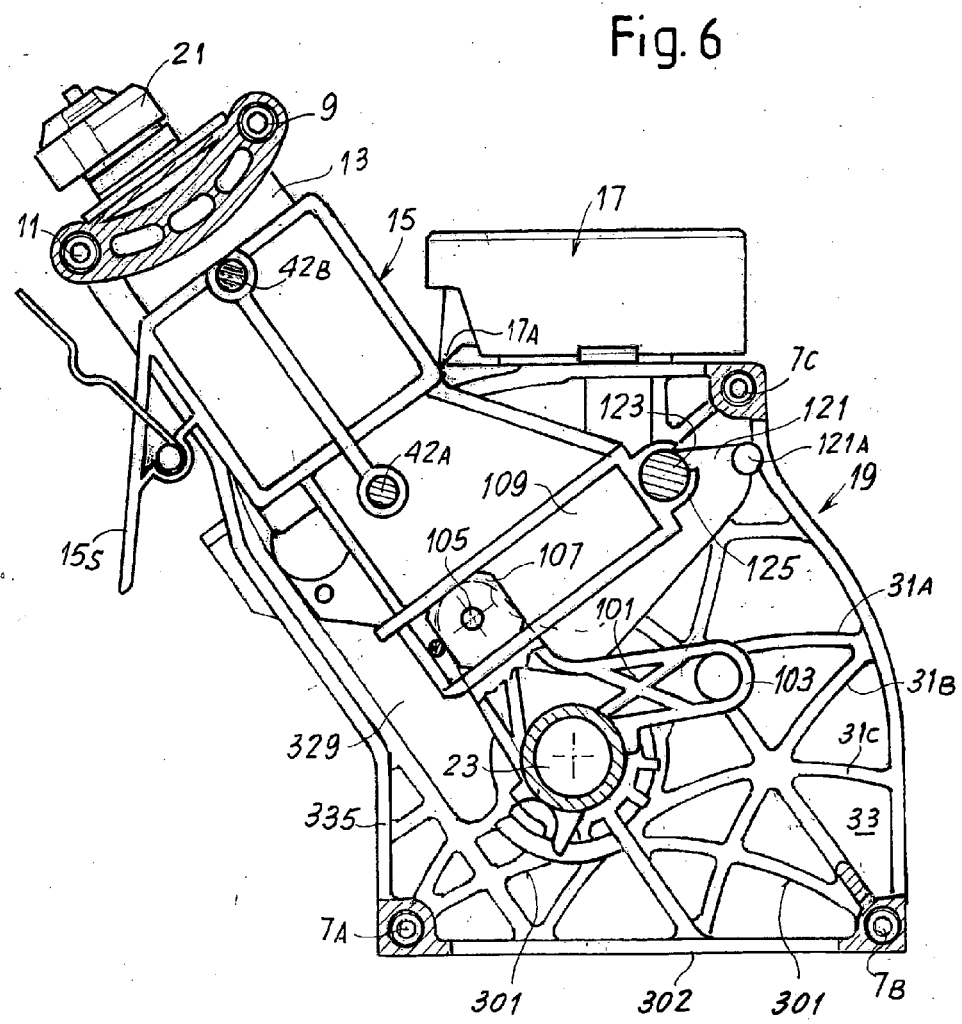
FIG. 6 shows a section similar to the section in FIG. 5, on a plane translated with respect to the plane of the section in FIG. 5.

On each side 3, 5, a respective rectilinear guide 41, along which the portion 15 of the infusion chamber moves, extends from the area supporting the shaft 23. This guide 41 is provided with openings 43 and adjacent thereto are further openings 33 defined between linear elements 31 that join the guide 41 to the edges of the respective side. A respective pair of sliders 42A, 42B (FIG. 6), constrained to the moving portion 15 of the infusion chamber, engage in each rectilinear guide 41. The sliders 42A, 42B engage in the guides 41 when the portion 15 of the infusion chamber is axially aligned with the fixed portion 13 of the infusion chamber and with the axis A-A of the motor shaft 23 (FIGS. 5, 6). The kinematic pair formed by each guide 41 and respective sliders 42A, 42B can also be produced with self-lubricating properties as described above. In proximity to the axis A-A of the motor shaft 23, a curved guide 41A connects to each of the two guides 41, which engages with the lower slider 42A when the moving portion 15 of the infusion chamber pivots from the position aligned with the hopper 17 to the position aligned with the portion 13 and vice versa.

The guides 41 of the two sides 3, 5 extend to an upper area thereof, in proximity to the crossbars 9, 11 reciprocally joining the sides 3, 5, in the position in which the fixed portion 13 of the infusion chamber is interlocked. This chamber is provided externally with a lip seal 47, which replaces conventional O-ring seals and which is more resistant than these to washing in a dishwasher. In particular, lip seals have more stable mechanical and tribological properties, and fewer variations in elasticity and resilience properties following washing even at high temperatures.

In a possible embodiment, the framework structure forming each of the sides 3, 5 is produced so that the stresses exerted on the motor shaft 23, i.e. on the area 39 of the plastic material forming the framework structure, in particular during the closing stage of the chamber 13 15 and infusion, are transferred towards the crossbars 7A, 7B, 7C.

As can be seen in the drawing, in an advantageous embodiment, on each side 3, 5 the area 39 of solid material is connected, by means of a respective arch structure 301, to the crossbars 7A, 7B located at the base of the infusion unit 1. This arch structure cooperates with a linear structure 302 forming a tie-rod that again joins the crossbars 7A, 7B and that extends along the base of the respective sides 3, 5.

Moreover, according to an advantageous embodiment, a connection formed, for example, of a double arch structure 303, 305 joins on each side 3, 5 the area 39 supporting the motor shaft 23 to the crossbar 7C. The crossbars 7B, 7C are in turn joined by a linear edge element 307. This configuration 301, 302, 303, 305, 307 allows the load, represented by a resultant F indicated schematically on the axis A (FIG. 3) of the shaft 23, to be transferred towards the crossbars 7A, 7B, 7C. According to an advantageous embodiment, the framework structure of this lower part of each side 3, 5 can be further stiffened by curved linear elements 31A-31J.

In the upper area of the infusion unit 1 the fixed portion 13 of the infusion chamber, also called counter-plunger, is locked and constrained by a structure that, according to a possible embodiment, can comprise on each side 3, 5 a double arch configuration 321, 323. This structure is produced with the extrados (i.e. the convexity) facing the axis A-A of the motor shaft 23 and is preferably centered with respect to the guide 41, which interlocks approximately at the highest point of the arch defined by said double arch structure 321, 323. In a modified embodiment, the arch structure could be single, i.e. have only the arch 321 or only the arch 323.

When there are two arches 321, 323, as in the example shown, the two arches 321, 323 can advantageously be joined to each other by stiffening fins 325. The arch configuration 321, 323 with the stiffening ribs or fins 325 define openings for water to pass through that facilitate washing of the unit and at the same time concentrate the material of the sides 3, 5 in areas in which the strains caused by the reaction forces to water pressure during the infusion stage are concentrated. By means of the arches 321, 323 these stresses are transferred to the crossbars 9 and 11.

According to a preferred embodiment of the invention, as well as the arch or arches 321, 323, the framework structure of each side 3, 5 also has a further arch element 327, facing in the opposite direction to the arches 321, 323, i.e. with the highest point substantially centered on the rectilinear guide 41 and interlocked therewith, and with the ends facing the base of the infusion unit. While the ends of the arches 321, 323 are suitably interlocked at the level of the crossbars 9, 11, the ends of the arch 327 are interlocked with linear edge elements 329 extending substantially parallel to the respective guide 41, which is approximately in an intermediate position between the linear elements 329. These linear elements 329, together with the central guide 41, form tie-rods to connect the block of the sides 3 or 5 constrained to the fixed portion 13 of the infusion chamber, and the core of material forming the area 39 in which the support of the shaft 23 is provided. This forms a hyperstatic closed structure to which the high stresses produced in the infusion chamber are transferred.

In a possible embodiment of the invention, as well as by the arch structure 327 and by the area 39 in which the material is concentrated about the axis A-A of the motor shaft 23, the linear elements 329 are also connected to the guide 41 by possible linear elements indicated with 31K, preferably arched shaped. The elements 31K preferably have a concavity facing the axis A-A of the motor shaft 23. Together with the linear elements 329 and with the central guide 41, these define openings 33 for water to pass through when the unit is placed in the dishwasher.

According to an advantageous embodiment, on each side 3, 5 the upper linear element 329 is connected by means of a linear edge element 333 to the crossbar 7C, while the lower linear element 329 is connected to the lower crossbar 7A by means of a linear element 335. On the side 5, the lower linear element 329 has (see in particular FIG. 2) a deviation with respect to the linear extension to define an elongated opening in the direction of the guide 41, indicated with 329A, extending inside which is the connector 350 by means of which pressurized water is fed into the infusion chamber.

The configuration described above can vary, also as a function of the overall form of the infusion unit. Nonetheless, it is advantageous for the framework structure of each side to have a configuration that transfers loads from the area surrounding the axis of the operating shaft towards the ends of the structure in which the joining crossbars (7A, 7B and 7C in the example in the drawing) of the two sides 3, 5 are located. Screws can be inserted in these crossbars to increase the stiffness of the reciprocal connection between the two sides. Moreover, the structure will preferably have a configuration that defines tie-rods such as those formed by the elements 41 and 329, between the area surrounding the shaft 23 and the area in which the fixed portion 13 of the infusion chamber is interlocked.

In the interlocking area of the fixed portion 13 there will preferably be crossbars connecting the two sides and a structure for transferring the stresses from the opening and closing direction of the infusion chamber, along which the stresses on the portions of said chamber act, towards the crossbars.

It is understood that the drawing only shows an example provided by way of a practical arrangement of the invention, which can vary in forms and arrangement without however departing from the scope of the concept underlying the invention. In particular, the concepts described above can also be applied to infusion units of other types, and more specifically to infusion units that use pre-packed capsules or pods of coffee powder, instead of loose powder. Infusion units of this type, which use pods or capsules, are also known on the market and do not require detailed description. In substance, they do not depart from the conceptual viewpoint with respect to the unit described herein, except for the presence of perforators to perforate the bottom and top surface of the capsule and to feed the water from one side and collect the coffee from the other.

Any reference numerals in the appended claims are provided to facilitate reading of the claims with reference to the description and to the drawing, and do not limit the scope of protection represented by the claims.

The invention claimed is:

1. A dishwasher washable removable infusion unit for producing hot beverages, the infusion unit comprising:
    an infusion chamber comprising a fixed portion and a moving portion;
    a mechanism coupled to the infusion chamber for opening and closing said infusion chamber;
    a supporting structure having at least two sides enclosing the infusion chamber and the mechanism, each side comprising a plurality of openings and respective structure guides including a plurality of second openings, the openings and second openings providing access to said infusion chamber and said mechanism; and
    a plurality of kinematic pairs having elements formed with different self-lubricating properties.

2. The infusion unit as claimed in claim 1, wherein in each pair one of said elements is made of a plastic self-lubricating material selected from at least one of molybdenum, graphite, and polytetrafluoroethylene and the other of said elements is made of a plastic not comprising the material.

3. The infusion unit as claimed in claim 1, further comprising a motor shaft to operate the mechanism, and having shaft supports for self supporting in said supporting structure, wherein said shaft supports and said motor shaft form a kinematic pair.

4. The infusion unit as claimed in claim 3, wherein the moving portion includes chamber guides, and further comprising a pivoting arm attached to said motor shaft and having arm sliders for sliding in the chamber guides, said arm sliders and said chamber guides form a kinematic pair.

5. The infusion unit as claimed in claim 1, wherein said moving portion includes second sliders engaging the structure guides and extend in an opening and closing direction of the infusion chamber, said structure guides and the corresponding second sliders form a respective kinematic pair.

6. The infusion unit as claimed in claim 1, further comprising a control lever connected to a base of the infusion chamber for controlling a movement of the base with respect to the moving portion, said second supports and said control lever forming a kinematic pair.

7. The infusion unit as claimed in claim 1, wherein said supporting structure comprises sides between which said infusion chamber and the mechanism are supported.

8. The infusion unit as claimed in claim 7, wherein at least one of said sides is provided with said openings.

9. The infusion unit as claimed in claim 1, wherein said openings are formed by a plurality of linear elements that provide a mechanical load-bearing structure for the infusion chamber and mechanism.

10. The infusion unit as claimed in claim 9, wherein said openings define a framework structure.

11. The infusion unit as claimed in claim 10, wherein said linear elements extend according to trends defined by force lines in said sides.

12. The infusion unit as claimed in claim 10, wherein said linear elements are curved.

13. The infusion unit as claimed in claim 10, further comprising a supporting seat connected to a motor shaft by the linear elements to perimeter edges of said supporting structure.

14. The infusion unit as claimed in claim 13, wherein the moving portion includes chamber guides that extend from said supporting seat and include through openings for washing.

15. The infusion unit as claimed in claim 14, wherein said chamber guides are joined at edges of said supporting structure by the linear elements.

16. The infusion unit as claimed in claim 14, wherein said chamber guides terminate at the supporting seat for constraining the fixed portion.

17. The infusion unit as claimed in claim 9, wherein said linear elements have an elongated cross section with a smaller transverse dimension and a larger transverse dimension extending orthogonal to the supporting structure.

18. The infusion unit as claimed in claim 1, wherein said supporting structure is made of self-lubricating material.

19. The infusion unit as claimed in claim 18, wherein said supporting structure is made of a plastic material to which a lubricating material is added.

20. The infusion unit as claimed in claim 7, wherein said sides are joined by a plurality of crossbars and each side includes linear elements defining a framework structure configured to transfer stresses exerted on the framework structure by forces acting on the fixed and moving portions towards said crossbars.

21. The infusion unit as claimed in claim 20, wherein each of said sides comprises an area surrounding a support for a motor shaft for opening and closing the infusion chamber and a plurality of linear elements that transfer stresses exerted on the shaft support towards the base of the respective side.

22. The infusion unit as claimed in claim 21, wherein said linear elements comprise at least one arch element having a curve and configured to join crossbars positioned along the base of the respective side, and to the extrados of which at least part of forces applied to the shaft support are transferred.

23. The infusion unit as claimed m claim 22, wherein each side comprises a base and a bottom linear element joins said crossbars positioned along the base of the side.

24. The infusion unit as claimed in claim 23, wherein a linear edge element extends from the base of each side for joining one of the crossbars of the base to an upper crossbar thereby connecting the two sides, the linear edge element is positioned higher than the support of the motor shaft.

25. The infusion unit as claimed in claim 24, wherein the arch element is provided on each side to connect the base of the side to said linear edge element, in an intermediate position between the crossbar of the base and the upper crossbar.

26. The infusion unit as claimed in claim 24, wherein each side comprises a connection that joins the area surrounding the shaft support to said upper crossbar.

27. The infusion unit as claimed in claim 26, wherein said connection comprises at least one joint linear element.

28. The infusion unit as claimed in claim 27, wherein said joint linear element is arched.

29. The infusion unit as claimed in claim 27, wherein said connection comprises two joint linear elements.

30. The infusion unit as claimed in claim 7, wherein said supporting structure comprises, in proximity to said fixed portion, a plurality of crossbars joining the sides adjacent to the fixed portion.

31. The infusion unit as claimed in claim 30, wherein said crossbars adjacent to the fixed portion are joined to each other by an arched connection on each of said sides.

32. The infusion unit as claimed in claim 31, wherein said arched connection has an extrados facing an axis of a motor shaft for opening and closing the infusion chamber.

33. The infusion unit as claimed in claim 31, wherein said arch connection has a double arch structure.

34. The infusion unit as claimed in claim 33, wherein said double arch structure comprises fins reciprocally connecting two substantially parallel arch connections.

35. The infusion unit as claimed in claim 32, wherein on each side said arched connection is joined, by a substantially rectilinear element to an area supporting the motor shaft.

36. The infusion unit as claimed in claim 35, wherein said substantially rectilinear element extends from the top of the arched connection towards the axis of the motor shaft.

37. The infusion unit as claimed in claim 34, wherein said substantially rectilinear element forms a guide for the closing movement of the infusion chamber.

38. The infusion unit as claimed in claim 34, wherein said substantially rectilinear element is joined, by means of an arch structure to linear elements defining the edge of the respective side, extending approximately parallel to said substantially rectilinear element.

39. The infusion unit as claimed in claim 38, wherein said arch structure has an extrados facing the crossbars adjacent to the fixed portion.

40. The infusion unit as claimed in claim 39, wherein said substantially rectilinear element is connected to said linear elements forming edges of the sides, by a plurality of auxiliary linear elements, distributed along the longitudinal extension of the substantially rectilinear element.

41. The infusion unit as claimed in claim 40, wherein said auxiliary linear elements have an arched shaped.

42. The infusion unit as claimed in claim 41, wherein said auxiliary linear elements have a concavity facing the axis of the motor shaft.

43. The infusion unit as claimed in claim 1, wherein said supporting structure is made of polyoxymethylene.

44. The infusion unit as claimed in claim 1, wherein one of the kinematic elements in the kinematic pairs is made of material selected from at least one of molybdenum, graphite, and polytetrafluoroethylene.

45. The infusion unit as claimed in claim 1, further comprising a lip seal positioned between said fixed portion and moving portion.

46. The infusion unit as claimed in claim 2, further comprising a motor shaft to operate the opening and closing mechanism of the infusion chamber, supported in supports produced in said supporting structure, and wherein said shaft supports and said motor shaft form a kinematic pair.

47. The infusion unit as claimed in claim 2, wherein the supporting structure includes structure guides and said moving portion includes second sliders engaging the structure guides and extending in an opening and closing direction of the infusion chamber, and each of said structure guides and the corresponding second slider form a respective kinematic pair.

* * * * *